Figure 1:
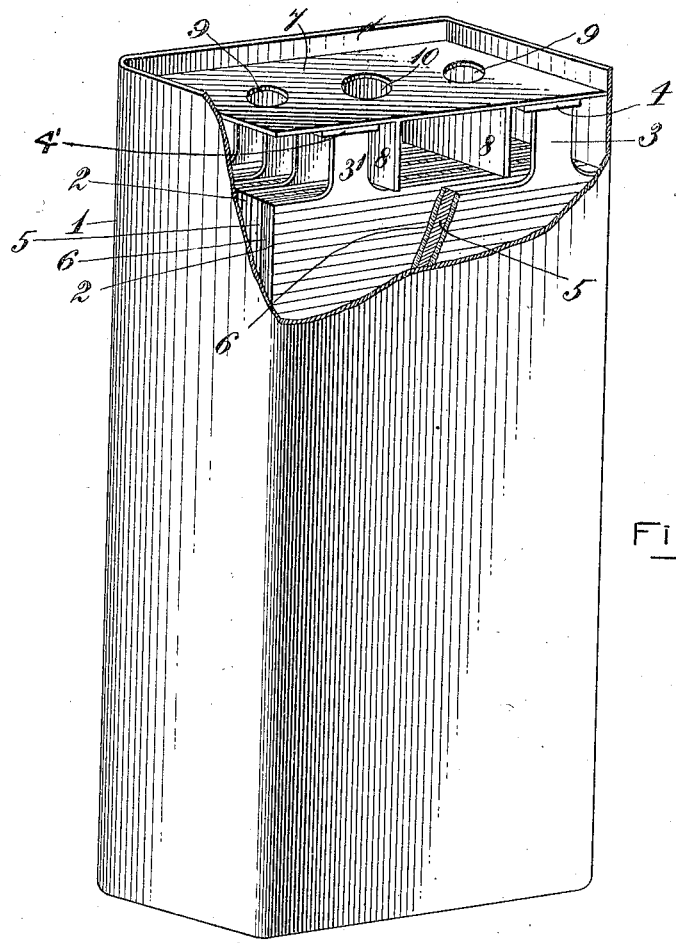

E. C. EKSTRÖMER.
STORAGE BATTERY.
APPLICATION FILED JUNE 3, 1907.

914,646.

Patented Mar. 9, 1909.

WITNESSES:
G. A. Higgins
Patrick J. Conroy

INVENTOR:
Edward C. Ekströmer
by Browne & Woodworth
atty's.

UNITED STATES PATENT OFFICE.

EDWARD C. EKSTRÖMER, OF BOSTON, MASSACHUSETTS, ASSIGNOR TO JOSEPH C. KENT, TRUSTEE.

STORAGE BATTERY.

No. 914,646.

Specification of Letters Patent.

Patented March 9, 1909.

Application filed June 3, 1907. Serial No. 376,895.

*To all whom it may concern:*

Be it known that I, EDWARD C. EKSTRÖMER, a subject of the King of Great Britain, and a resident of Boston, in the county of Suffolk and State of Massachusetts, have invented a new and useful Improvement in Storage Batteries, of which the following is a specification.

My invention relates to storage batteries and its object is to provide a convenient and effective means for closing the battery casing and for holding the elements thereof and their separators in position while the battery is in service.

For the purpose of more fully disclosing my invention I have illustrated in the drawings which accompany and form a part of this specification one simple embodiment thereof which has been found to give good results in practice; but it will be understood that many modifications may be made therein by those skilled in the art without departing from the spirit of my invention.

Figure 2:
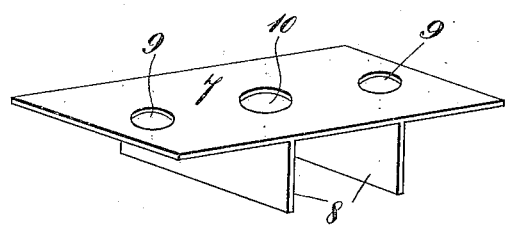

In the drawings:—Figure 1 is a perspective view, partly in section, of a storage battery constructed in accordance with my invention. Fig. 2 is a perspective view of the cover of said battery.

In the figures, 1 represents the hard rubber casing of a storage battery containing the plates or elements 2, separated by wooden and hard rubber separators shown, respectively, at 5 and 6. The positive plates terminate in upwardly extending lugs 3 to the tops of which is electrically connected the conducting strap 4, while the negative plates terminate in similar lugs 3' connected with the strap 4'.

It is essential in the operation of storage batteries that the wooden or other separators of the plates be maintained in position and for this purpose it is necessary to provide means whereby they may be prevented from rising and thereby exposing the lower ends of the plates. The particular means shown in the accompanying drawings whereby I accomplish this result consists in the cover comprising the plate 7 of hard rubber or other suitable insulating material, which as shown, is adapted to fit and thereby close the battery casing, and which is provided with depending members extending transversely to the battery elements and their separators. The members 8, 8, may be formed integral with the cover and are so arranged that their lower edges are in contact with the upper edges of the battery elements when said cover is in position. The cover 7 may be provided with apertures 9, 9, through which electrical contact may be made with the straps 4, 4' by any suitable means, and may be provided also with a vent 10.

It will be obvious that by means of my invention I provide a very simple and effective device for preventing any upward movement of the separators during the employment of the battery.

I claim:

In a storage battery having metallic elements and wooden separators therefor, a cover comprising a plate of non-flexible insulating material adapted to fit and thereby close the battery casing and provided with depending members formed integral with said plate, said depending members being arranged transversely to said metallic elements and wooden separators and having their lower edges in contact with all of said elements when said cover is in position.

In testimony whereof, I have hereunto subscribed my name this first day of June 1907.

EDWARD C. EKSTRÖMER.

Witnesses:
 CHARLES C. KURTZ,
 GEO. K. WOODWORTH.